(12) United States Patent
Hashimoto et al.

(10) Patent No.: US 11,840,045 B2
(45) Date of Patent: Dec. 12, 2023

(54) ROLL-BONDED LAMINATE

(71) Applicant: TOYO KOHAN CO., LTD, Tokyo (JP)

(72) Inventors: Yusuke Hashimoto, Yamaguchi (JP); Kota Sadaki, Yamaguchi (JP); Teppei Kurokawa, Yamaguchi (JP); Takashi Koshiro, Yamaguchi (JP); Takafumi Hatakeda, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 16/498,167

(22) PCT Filed: Mar. 29, 2018

(86) PCT No.: PCT/JP2018/013263
§ 371 (c)(1),
(2) Date: Sep. 26, 2019

(87) PCT Pub. No.: WO2018/181721
PCT Pub. Date: Oct. 4, 2018

(65) Prior Publication Data
US 2021/0101364 A1  Apr. 8, 2021

(30) Foreign Application Priority Data

Mar. 29, 2017 (JP) .................. 2017-066268
Jun. 20, 2017 (JP) .................. 2017-120895
Dec. 22, 2017 (JP) .................. 2017-246456

(51) Int. Cl.
*B32B 15/00* (2006.01)
*B32B 15/01* (2006.01)
(Continued)

(52) U.S. Cl.
CPC ............ *B32B 15/012* (2013.01); *B23K 20/04* (2013.01); *B32B 15/20* (2013.01); *C23F 4/00* (2013.01);
(Continued)

(58) Field of Classification Search
None
See application file for complete search history.

(56) References Cited

U.S. PATENT DOCUMENTS

| | | | | |
|---|---|---|---|---|
| 2012/0208703 | A1* | 8/2012 | Okayama | ................ B32B 15/04 505/239 |
| 2013/0040821 | A1* | 2/2013 | Okayama | .............. C22C 38/007 505/239 |
| 2018/0281103 | A1* | 10/2018 | Nanbu | .................... B32B 15/01 |

FOREIGN PATENT DOCUMENTS

| | | | | |
|---|---|---|---|---|
| JP | 61042498 | A * | 2/1986 | ............ B23K 20/04 |
| JP | 63-252682 | A | 10/1988 | |

(Continued)

OTHER PUBLICATIONS

Ishio et al., Machine translation of JP 2000-312979 Abstract, Description and Claims, Nov. 14, 2000 (Year: 2000).*
(Continued)

*Primary Examiner* — Mary I Omori
(74) *Attorney, Agent, or Firm* — Foley & Lardner LLP

(57) ABSTRACT

This invention provides a relatively thick roll-bonded laminate that exhibits a high Erichsen value and excellent molding workability. Such roll-bonded laminate is composed of a stainless steel layer and a non-stainless steel metal layer, and it is characterized in that thickness T is 0.2 mm to 3 mm and a correlation between a proportion $P_{SUS}$ of thickness $T_{SUS}$ of the stainless steel layer relative to thickness T and a half width $FWHM_{200}$ of a peak exhibiting a crystal plane orientation (200) determined by X-ray diffrac-
(Continued)

tion analysis of the stainless steel layer side satisfies the correlation represented by the formula: $FWHM_{200} \leq 0.0057 P_{SUS} + 0.4$.

3 Claims, 6 Drawing Sheets

(51) Int. Cl.
  *B23K 20/04* (2006.01)
  *B32B 15/20* (2006.01)
  *C23F 4/00* (2006.01)
  *B23K 103/10* (2006.01)
  *B23K 103/04* (2006.01)

(52) U.S. Cl.
  CPC ...... *B23K 2103/05* (2018.08); *B23K 2103/10* (2018.08)

(56) References Cited

FOREIGN PATENT DOCUMENTS

| JP | 0839269 A | * | 2/1996 | | |
| JP | 2000312979 A | * | 11/2000 | | |
| JP | 3092598 U | | 3/2003 | | |
| WO | WO 2017/057665 A1 | | 4/2017 | | |
| WO | WO-2018166063 A1 | * | 9/2018 | ............. | B32B 15/01 |

OTHER PUBLICATIONS

Yonemitsu et al., Machine translation of JP H08-39269, Feb. 13, 1996 (Year: 1996).*
Abe et al. Machine translation of JP 61-042498, Feb. 28, 1986 (Year: 1986).*
Gu et al., Machine translation of WO 2018/166063, Sep. 20, 2018 (Year: 2018).*
Erichsen Cupping test for sheet metal, Mar. 8, 2020, Testing and Chacterization of Engineering Materials, https://materials-today.com/erichsen-cupping-test-for-sheet-metal/ (Year: 2020).*
International Search Report dated May 15, 2018, in PCT/JP2018/013263.
Office Action dated Dec. 7, 2021 in JP 2018-139377.
Office Action dated May 17, 2022 in KR 10-2019-7031161.

* cited by examiner

ROLL-BONDED LAMINATE

CROSS-REFERENCE TO RELATED APPLICATIONS

This application is the U.S. National Stage of PCT/JP2018/013263, filed Mar. 29, 2018, which claims priority to JP 2017-066268, filed Mar. 29, 2017, JP 2017-120895, filed Jun. 20, 2017, and JP 2017-246456, filed Dec. 22, 2017.

TECHNICAL FIELD

The present invention relates to a roll-bonded laminate.

BACKGROUND ART

Metallic materials are used in a wide variety of fields. For example, metallic materials are used as press-molded parts for an electronic device, such as a mobile electronic device housing. Such metallic materials are required to exhibit high-level press workability. As such metallic materials, a roll-bonded laminate (e.g., a metal laminated material or clad material) comprising two or more types of metal plates or metal foils laminated on top of each other is known, in addition to a metallic material consisting of a single type of metal. A roll-bonded laminate is a sophisticated metallic material with multiple properties that cannot be achieved by a single material. For example, a roll-bonded laminate composed of stainless steel and aluminum superposed on top of the other has been studied.

Metal components used for an electric device comprising a roll-bonded laminate are generally formed via press work. Press work is roughly classified into shear press work, bending work, and drawing work, and, in particular, a housing is formed via drawing work. Through drawing work, a roll-bonded laminate is immobilized on a die, and a punch is pushed into a hole provided on a die to form a container. Thus, drawing work is more difficult to perform than other press work. In drawing work, stretch formability of a roll-bonded laminate is an important parameter, and high stretch formability is required.

As a conventional roll-bonded laminate (e.g., a metal laminate or a clad material) excellent in molding workability, Patent Literature 1 discloses a metal laminate of a bi-layer structure composed of a stainless steel layer and an aluminum layer, wherein tensile strength (TS) is 200 MPa to 550 MPa, elongation (EL) is 15% or higher, and surface hardness (Hv) of the stainless steel layer is 300 or lower.

CITATION LIST

Patent Literature

Patent Literature 1: WO 2017/057665

SUMMARY OF INVENTION

Technical Problem

The roll-bonded laminate of Patent Literature 1 has tensile strength, elongation, and surface hardness of the stainless steel layer within the given range. Thus, molding workability as high as a stretch height (the Erichsen value) of 6.0 mm or more determined by the Erichsen test can be achieved. The roll-bonded laminate of Patent Literature 1, however, is a thin roll-bonded laminate used for a radiation member of an electronic device or the like. Accordingly, the roll-bonded laminate with thickness suitable for housing application, such as a 0.4-mm-thick or larger tri-layer laminate or a 0.3-mm-thick or larger bi-layer laminate, was not sufficiently examined.

As thickness of the roll-bonded laminate is increased, a pressure necessary at the time of roll bonding is increased, and hardness of the stainless steel layer or the like is more increased. As thickness of the stainless steel layer is increased, accordingly, regulation of hardness becomes more difficult. As hardness is increased, in general, an extent of elongation is decreased. Accordingly, it was difficult to obtain a roll-bonded laminate with molding workability necessary for housing applications.

Under the conventional circumstances as described above, the present invention is intended to provide a relatively thick roll-bonded laminate, which exhibits a high Erichsen value and excellent molding workability, and a method for producing the same.

Solution to Problem

The present inventors have conducted concentrated studies in order to resolve the problem described above. As a result, they discovered that a texture (i.e., grain size, orientation, and strain) of a stainless steel layer of the roll-bonded laminate would affect elongation properties of the roll-bonded laminate and that molding workability necessary for housing applications could be obtained if the texture and the proportion of stainless steel layer thickness would satisfy a particular correlation. This has led to the completion of the present invention. Specifically, the present invention is summarized as follows.

(1) A roll-bonded laminate composed of a stainless steel layer and a non-stainless steel metal layer, wherein thickness T is 0.2 mm to 3 mm, and
a correlation between a proportion $P_{SUS}$ of thickness $T_{SUS}$ of the stainless steel layer relative to the thickness T and a half width $FWHM_{200}$ of a peak exhibiting a crystal plane orientation (200) obtained by analyzing the stainless steel layer side via X-ray diffraction analysis satisfy the correlation: $FWHM_{200} \leq 0.0057 P_{SUS} + 0.4$.

(2) The roll-bonded laminate according to (1), wherein the non-stainless steel metal layer is a layer of a metal selected from the group consisting of aluminum, an aluminum alloy, and copper.

(3) The roll-bonded laminate according to (1) or (2), which is used for an electronic device housing.

(4) An electronic device housing using the roll-bonded laminate according to (1) or (2).

This description includes part or all of the content as disclosed in Japanese Patent Application Nos. 2017-066268, 2017-120895, and 2017-246456, which are priority documents of the present application.

Advantageous Effects of Invention

The present invention can provide a relatively thick roll-bonded laminate, which exhibits high molding workability; that is, a stretch height as high as 7 mm or higher determined by the the Erichsen test. This roll-bonded laminate can be suitably used for a member of a housing for various types of electronic devices such as mobile electronic devices with the utilization of excellent molding workability.

DESCRIPTION OF EMBODIMENTS

Hereafter, the present invention is described in detail.

I. The Roll-Bonded Laminate

Figure 1:
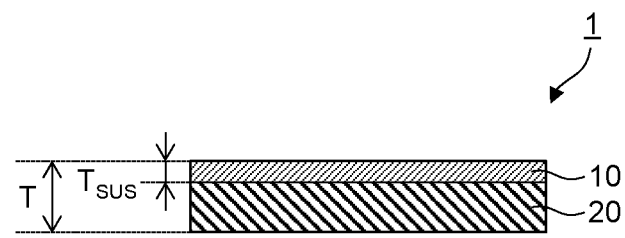
FIG. 1 schematically shows a cross section of the roll-bonded laminate according to an embodiment of the present invention.

The roll-bonded laminate according to an embodiment of the present invention is described with reference to FIG. 1. As shown in FIG. 1, the roll-bonded laminate 1 according to the present embodiment is composed of a stainless steel (SUS) layer 10 and a non-stainless steel metal layer 20.

As stainless steel used for a stainless steel layer 10, for example, a stainless steel plate SUS304, SUS201, SUS316, SUS316L, or SUS430 can be used, although stainless steel is not limited thereto.

A metal constituting a non-stainless steel metal layer 20 can be adequately selected in accordance with applications or intended properties of the roll-bonded laminate. Specific examples thereof include aluminum, an aluminum alloy, copper, a copper alloy, magnesium, and a magnesium alloy. Use of a metal selected from the group consisting of aluminum, an aluminum alloy, and copper is particularly preferable. Such metal is roll-bonded to a stainless steel layer, so that radiation performance and lightweight properties of the roll-bonded laminate can be improved. Thus, a roll-bonded laminate that is suitable for a housing for a mobile electronic device or the like can be obtained.

As an aluminum alloy used for an aluminum alloy layer, an aluminum alloy plate in which the total content of the additive metal elements (i.e., at least one additive metal element selected from Mg, Mn, Si, and Cu as a metal element other than aluminum) exceeds 1% by mass can be used.

For example, aluminum alloys defined by JIS, such as Al—Cu-base alloy (2000 series), Al—Mn-base alloy (3000 series), Al—Si-base alloy (4000 series), Al—Mg-base alloy (5000 series), Al—Mg—Si-base alloy (6000 series), and Al—Zn-Mg-base alloy (7000 series), can be used. From the viewpoint of press workability, strength, and corrosion resistance, aluminum alloys of 3000 series, 5000 series, 6000 series, and 7000 series are preferable. From the viewpoint of the balance between such properties and cost, an aluminum alloy of 5000 series is more preferable. An aluminum alloy preferably contains Mg in an amount of 0.3% by mass or more.

As aluminum, a pure aluminum plate material in which a total content of additive metal elements other than aluminum is 1% by mass or lower can be used. An example of pure aluminum that can be used is the 1000 series pure aluminum defined by JIS. A total content of additive metal elements other than aluminum in pure aluminum is preferably 0.5% by mass or lower, more preferably 0.3% by mass or lower, and particularly preferably 0.15% by mass or lower.

As copper, a copper plate material in which a total content of additive metal elements other than copper is 1% by mass or lower can be used. A specific example is a C1100 plate material. An example of a copper alloy is a Corson copper alloy.

Thickness T of the roll-bonded laminate 1 is not particularly limited. It is generally 0.2 mm to 3 mm, preferably 0.3 mm to 2.2 mm, and particularly preferably 0.4 mm to 1.5 mm. Thickness T of the roll-bonded laminate 1 is a total thickness of the stainless steel layer 10 and the non-stainless steel metal layer 20. Thickness T of the roll-bonded laminate is an average of thickness measured at arbitrary 30 points on the roll-bonded laminate 1 with the use of, for example, a micrometer.

In general, a stainless steel layer 10 with thickness $T_{SUS}$ of 0.01 mm or more can be used. From the viewpoint of drawing workability and strength, the lower limit is preferably 0.045 mm, and more preferably 0.05 mm. While the upper limit is not particularly limited, lightweight properties and radiation performance may be deteriorated when the stainless steel layer 10 is excessively thick relative to the non-stainless steel metal layer 20. Thus, $T_{SUS}$ is preferably 0.6 mm or less, and more preferably 0.5 mm or less. When weight reduction is further intended, $T_{SUS}$ is particularly preferably 0.4 mm or less. In order to retain radiation performance of the roll-bonded laminate 1, thickness of the stainless steel layer 10 is preferably smaller than that of the non-stainless steel metal layer 20. Specifically, the proportion $P_{SUS}$ of thickness $T_{SUS}$ of the stainless steel layer 10 relative to thickness T is preferably 5% to 70%, more preferably 7% to 60%, and further preferably 15% to 50%. Thickness ($T_{SUS}$) of the stainless steel layer 10 of the roll-bonded laminate 1 is determined by obtaining an optical microscopic photograph of a cross section of the roll-bonded laminate 1, measuring thickness of the stainless steel layer 10 at arbitrary 10 points in the optical microscopic photograph, and calculating the average thickness. When producing the roll-bonded laminate, stainless steel plate materials are bonded at a given reduction ratio. Thus, thickness of the stainless steel layer of the roll-bonded laminate is smaller than that of the stainless steel plate material before bonding.

The roll-bonded laminate 1 according to the present embodiment is characterized in that a correlation between a proportion $P_{SUS}$ of thickness $T_{SUS}$ of the stainless steel layer 10 relative to thickness T and a half width $FWHM_{200}$ of a peak exhibiting a crystal plane orientation (200) determined by X-ray diffraction analysis of the stainless steel layer 10 satisfies the correlation represented by the formula below. The peak exhibiting the plane orientation (200) appears in the range of 2θ=48° to 52° when the stainless steel layer 10 is analyzed at 20/0, the tube voltage of 45 kV, and the tube current of 200 mA with the use of the radiation source of CuKα. The half width $FWHM_{200}$ is a width()° of a peak at a position that is a half (H/2) of a height (H) of the peak.

$$FWHM_{200} \leq 0.0057 P_{SUS} + 0.4$$

When the correlation above is satisfied, the crystal grain condition of the stainless steel layer 10 is optimized in terms of the correlation with the proportion $P_{SUS}$ of the stainless steel layer 10. Even if the roll-bonded laminate 1 is relatively thick (0.2 mm to 3 mm), accordingly, the roll-bonded laminate 1 can achieve excellent molding workability.

In contrast, a peak resulting from stainless steel workability is likely to appear at a position very near the diffraction peak (111); that is, in the range of 2θ=43° to 45°, this peak causes the broadening of the diffraction peak (111), and isolation of the diffraction peak becomes difficult as a consequence. Thus, it is difficult to identify the half width derived from (111). Unlike the case of (111), (220) and (311) are not influenced by the peak depending on workability. However, the crystal-derived intensity of (220) and (311) is lower than that of (111) and (200), and the diffraction peak is influenced by the background intensity. For this reason, the correlation between the half width and the thickness proportion was not obtained. Concerning the peak (200), it was found that high molding workability could be obtained when the half width and the thickness proportion satisfied the correlation represented by the formula above.

Specifically, the present inventors found the following. When a laminate is relatively thick, molding workability can be improved because of the increased thickness. In the case of a roll-bonded laminate, however, a pressure necessary at the time of bonding is increased. As a result, crystal grains of the stainless steel layer become very small, hardness thereof is increased via introduction of work strain, and elongation is deteriorated. Thus, it is difficult to obtain a roll-bonded laminate with molding workability necessary for a housing. They also discovered that, by focusing a half width as a parameter of the stainless steel layer after bonding; that is, the stainless steel layer influenced by bonding, a molding workability could be optimized by regulating the half width of the plane (200) and the thickness proportion of the stainless steel layer and the roll-bonded laminate with excellent molding workability could be obtained when the correlation above would be satisfied. Specifically, the roll-bonded laminate 1 can achieve high molding workability determined by the Erichsen test; that is, a stretch height (Erichsen value) is 7.0 mm or more, and preferably 8.0 mm. The stretch height can be measured by the Erichsen test with the use of, for example, the mechanical Erichsen tester ESM-1 (cap: 2 mm; manufactured by Tokyo Koki Testing Machine Co., Ltd.) in accordance with JIS Z 2247 (Method of Erichsen test).

The present inventors also discovered that it is more preferable that the roll-bonded laminate satisfying the above correlation further satisfy the correlation described below in terms of the half width $FWHM_{200}$ of the peak of the plane (200) and thickness $T_{SUS}$ of the stainless steel layer. Thus, molding workability of the roll-bonded laminate is further improved.

$$FWHM_{200} \leq 0.517 T_{SUS} + 0.4$$

Surface hardness (Hv) of the stainless steel layer 10 of the roll-bonded laminate 1 according to the present embodiment is adequately determined by taking the balance between molding workability and damage resistance of the roll-bonded laminate into consideration. In the present invention, surface hardness (Hv) can be measured with the use of, for example, the Micro vickers hardness tester (load: 200 gf) in accordance with JIS Z 2244 (Vickers hardness test—Test method).

The peel strength (180° peel strength, also referred to as "peel strength of 180 degrees") as the indicator of adhesion strength of the roll-bonded laminate 1 of the present embodiment is preferably 60 N/20 mm or higher. From the viewpoint of excellent drawing workability, the peel strength of the roll-bonded laminate is more preferably 80 N/20 mm or higher, and particularly preferably 100 N/20 mm or higher. When the peel strength is improved to a significant extent, the material would be broken instead of peeling. Thus, there is no upper limit of the peel strength.

The peel strength of the roll-bonded laminate 1 is determined by preparing a test piece of a width of 20 mm from the roll-bonded laminate 1, partly separating the stainless steel layer 10 from the non-stainless steel metal layer 20, fixing the thick layer side or hard layer side, and measuring the force required to pull one layer from the fixed side in the direction 180 degrees opposite therefrom. The peel strength is represented in terms of "N/20 mm." When a similar test is performed with the use of a test piece of a width of 10 mm to 30 mm, peel strength would not change.

When a roll-bonded laminate exhibiting high peel strength is subjected to drawing work, one layer can fit the shape of the other layer, and both the layers can be processed without breaking.

The roll-bonded laminate 1 has high drawing workability, and the limiting drawing ratio thereof is preferably 1.20 or higher, more preferably 1.63 or higher, and further preferably 1.83 or higher. The limiting drawing ratio (Dmax/d) of the roll-bonded laminate is determined in the manner described below. That is, the maximal blank diameter at which a cylindrical form can be prepared via a single operation of drawing work without breaking at a drawing ratio (D/d) of the blank diameter (D) relative to the diameter (d) of the cylinder is designated as Dmax, and Dmax/d is then calculated.

The roll-bonded laminate 1 of the present embodiment preferably has the elongation of 35% or higher, and more preferably 40% or higher, measured by a tensile test involving the use of a test piece with a width of 15 mm from the viewpoint of satisfactory press workability. The elongation can be measured by a tensile test in accordance with the measurement of elongation at break defined by JIS Z 2241 or JIS Z 2201 with the use of, for example, the test piece for the tensile test described below.

The roll-bonded laminate 1 preferably exhibits tensile strength of 3,000 N or higher, and more preferably 3,500 N or higher, measured by a tensile test involving the use of a test piece with a width of 15 mm from the viewpoint of sufficient strength and press workability. The term "tensile strength" used herein refers to the maximal load applied in the tensile test. The tensile strength can be measured with the use of, for example, a universal testing machine, TENSILON RTC-1350A (manufactured by Orientec Corporation), in accordance with JIS Z 2241 or JIS Z 2201 (Metallic materials—Method of tensile testing). A width of the test piece (15 mm) is the width specified for Special Test Piece No. 6 by JIS Z 2201. When measurement is carried out in accordance with JIS Z 2241, for example, Test Piece No. 5 can be used. The tensile strength determined with the use of Test Piece No. 6 may be converted into the tensile strength determined with the use of Test Piece No. 5 by multiplying a factor of the test piece width; i.e., 25 mm/15 mm, which is about 1.66 times.

II. Method for Producing the Roll-Bonded Laminate

When producing the roll-bonded laminate 1, a stainless steel plate material and a non-stainless steel metal plate material are prepared, and these plate materials are bonded to each other by various means, such as cold roll bonding, hot roll bonding, or surface-activated bonding. Bonding is preferably followed by stabilizing heat treatment. According to hot roll bonding, layers are roll-bonded to each other while applying heat at a temperature equivalent to or higher than the recrystallization temperature for the laminate. Compared with cold roll bonding, layers can be bonded to each other at a lower force, although an intermetallic compound is likely to be generated at the bonding interface. In order to prevent an intermetallic compound from being generated, accordingly, heating temperature, a heating duration, and other conditions should be adequately selected.

According to cold roll bonding, a surface of the stainless steel plate material and a surface of a non-stainless steel metal plate material to be bonded to each other are subjected to brush polishing or other means, the stainless steel plate material and the non-stainless steel metal plate material are superposed on top of each other and bonded to each other via cold rolling, and the resultant is then subjected to annealing. Thus, the laminate of interest can be prepared. Cold roll bonding may comprise a plurality of steps, and annealing may be followed by conditioning. According to such technique, roll bonding is carried out to a final reduction ratio of 20% to 90%. When producing the laminate via cold bonding, thickness of the original stainless steel plate is 0.0125 to 6 mm, preferably 0.056 to 5 mm, and more preferably 0.063 to 4 mm, and thickness of the non-stainless steel metal plate material is 0.063 to 25 mm, preferably 0.13 to 17 mm, and more preferably 0.25 to 11 mm from the viewpoint of the reduction ratio described above.

In the case of hot roll bonding, the surfaces to be bonded to each other are subjected to brush polishing or other means as in the case of cold roll bonding, either or both plate(s) is/are heated to 200° C. to 500° C., and the plates are superposed on top of each other and bonded to each other via hot roll bonding. Thus, the laminate of interest can be prepared. According to this technique, a final reduction ratio is approximately 15% to 40%. When producing the laminate via hot roll bonding, thickness of the original stainless steel plate is 0.012 to 1 mm, preferably 0.053 to 0.83 mm, and more preferably 0.059 to 0.067 mm, and thickness of the original non-stainless steel metal plate material is 0.059 to 4.2 mm, preferably 0.19 to 2.8 mm, and more preferably 0.24 to 1.8 mm from the viewpoint of the reduction ratio described above.

The roll-bonded laminate 1 is preferably produced via surface-activated bonding from the viewpoint of ease of suppression of work strain occurring in the stainless steel layer at the time of bonding. Preferable embodiments are as described below. Specifically, the roll-bonded laminate 1 can be produced by a method comprising: a step of preparing a stainless steel plate and a non-stainless steel metal plate (hereafter referred to as "the other metal plate") and subjecting the surface of the stainless steel plate and the surface of the other metal plate to sputter etching; a step of roll bonding the surfaces subjected to sputter-etching to each other at a light reduction ratio of the stainless steel layer to 0% to 25%; and a step of performing batch thermal treatment at 200° C. to 500° C. or continuous thermal treatment at 300° C. to 890° C.

As a stainless steel plate, an annealed material (BA material), 1/2H material, or the like is preferably used from the viewpoint of molding workability, although a stainless steel plate is not limited thereto.

In general, thickness of a stainless steel plate before bonding may be 0.01 mm or more. The lower limit of thickness is preferably 0.045 mm, and more preferably 0.05 mm from the viewpoint of drawing workability, strength, and ease of handling in the form of a roll-bonded laminate. While the upper limit is not particularly limited, elongation and drawing workability in the form of the roll-bonded laminate may be deteriorated when a stainless steel layer is excessively thick relative to the other metal layer. Accordingly, thickness is preferably 0.8 mm or less, and more preferably 0.67 mm or less. When weight reduction is further intended, the upper limit is particularly preferably 0.53 mm. Thickness of the stainless steel plate before bonding is an average of thickness measured at 10 points randomly selected on the stainless steel plate surface with the use of, for example, a micrometer.

The other metal plate to be bonded to the stainless steel plate can be adequately selected from among various types of metal plates in accordance with a metal type. In general, thickness of the other metal plate before bonding may be 0.05 mm or more. The lower limit of thickness is preferably 0.1 mm, and more preferably 0.2 mm. The upper limit is generally 3.3 mm, preferably 2.3 mm, and more preferably 1.5 mm from the viewpoint of weight reduction and cost. Thickness of the other metal plate before bonding can be determined in the same manner as in the case of the stainless steel plate described above.

Specifically, sputter etching is carried out by preparing the stainless steel plate and the other metal plate as a long coil with a width of 100 mm to 600 mm, designating the stainless steel plate connected to the other metal plate as a ground-connected electrode, applying an alternating current of 1 MHz to 50 MHz to a region between the ground-connected electrode and the other insulated electrode to generate a glow discharge, and adjusting an area of the electrode exposed to the plasma generated by the glow discharge to one third or less of the area of the other electrode. During sputter-etching, the ground-connected electrode is in the form of a cooling roll, which prevents the transfer materials from temperature increase.

Sputter-etching treatment is intended to completely remove substances adsorbed to the surfaces and remove a part of or the entire oxide film on the surfaces by subjecting the surfaces of the stainless steel plate and the other metal plate to be bonded to each other to sputtering with inert gas in vacuum. It is not necessary to completely remove the oxide film, and the stainless steel layer can be sufficiently bonded to the other metal plate in the presence of a remaining part of the oxide film. In the presence of a remaining part of the oxide film, the duration of the sputter-etching treatment is shortened to a significant extent, and productivity of the roll-bonded laminate is improved, compared to the case in which the oxide film is completely removed. Examples of inert gas that can be applied include argon, neon, xenon, krypton, and a mixed gas comprising at least one of the inert gases mentioned above. Substances adsorbed to the surface of the stainless steel plate or the other metal plate can be completely removed with the etching amount of about 1 nm (in terms of $SiO_2$).

In the case of a single plate, for example, the stainless steel plate can be subjected to sputter-etching in vacuum at a plasma output of 100 W to 1 kW for 1 to 50 minutes. In the case of a long material such as a line material, for example, it can be subjected to sputter-etching in vacuum at a plasma output of 100 W to 10 kW and a line velocity of 1 m/min to 30 m/min. While a higher degree of vacuum is preferable in order to prevent substances from being readsorbed to the surface, a degree of vacuum of, for example, $1 \times 10^{-5}$ Pa to 10 Pa is sufficient. In sputter-etching, temperature of the stainless steel plate is preferably maintained at room temperature to 150° C., so as to prevent the other metal plate from softening.

A stainless steel plate comprising an oxide film remaining in a part on its surface can be obtained by adjusting the etching amount of the stainless steel plate to, for example, 1 nm to 10 nm. According to need, the amount of etching may exceed 10 nm.

Sputter etching conditions for the other metal plate are adequately determined in accordance with a metal type. In the case of a single plate, for example, the aluminum alloy plate can be subjected to sputter-etching in vacuum at a plasma output of 100 W to 1 kW for 1 to 50 minutes. In the case of a long material such as a line material, for example, it can be subjected to sputter-etching at a plasma output of 100 W to 10 kW and a line velocity of 1 m/min to 30 m/min. While a higher degree of vacuum is preferable in order to prevent substances from being readsorbed to the surface, a degree of vacuum of $1 \times 10^{-5}$ Pa to 10 Pa is sufficient.

An aluminum alloy plate comprising an oxide film remaining in a part on its surface can be obtained by adjusting the etching amount of the aluminum alloy plate to, for example, 1 nm to 10 nm. According to need, the amount of etching may exceed 10 nm.

The surface of the stainless steel plate and the surface of the other metal plate subjected to sputter etching are pressure-bonded, for example, roll-bonded to each other at a light reduction ratio of the stainless steel layer to 0% to 25%. Thus, the stainless steel plate is bonded to the other metal plate.

A reduction ratio of a stainless steel layer is preferably 0% to 10%, and more preferably 0% to 8%. When a reduction ratio of a stainless steel layer is within the range mentioned above, work hardening of the stainless steel layer caused by work strain can be suppressed. Thus, deterioration in elongation and press workability can be suppressed. Effects of softening by thermal treatment after roll bonding are insignificant for the stainless steel layer. Thus, it is necessary to adjust the reduction ratio at the time of roll bonding to regulate the influence of work hardening.

The reduction ratio of the entire roll-bonded laminate is preferably 0% to 25%, more preferably 0% to 15%, and further preferably 10% or lower. When the reduction ratio of the entire roll-bonded laminate is 25% or lower, work strain in the stainless steel layer would not be excessive, and sufficient strength and elongation can be achieved. Accordingly, the roll-bonded laminate with high press workability is easily obtained. In addition, thickness of each layer can be maintained relatively even, and high press workability can be thus achieved. When a thin layer is generated at the time of roll bonding, specifically, a load is likely to be applied locally at the time of press working, and the laminate may become easy to break. The reduction ratio of the roll-bonded laminate is determined based on the total thickness of the stainless steel plate material and the other metal plate material before bonding and the thickness of the final form of the roll-bonded laminate. Specifically, the reduction ratio of the roll-bonded laminate is determined by the formula: (the total thickness of the stainless steel plate and the other metal plate before bonding—the thickness of the final form of the roll-bonded laminate)/the total thickness of the stainless steel plate and the other metal plate before bonding.

A line pressure load for roll bonding is not particularly limited. It can be adequately determined to achieve a given reduction ratio of the stainless steel layer. For example, a line pressure load can be adjusted within a range of 1.0 tf/cm to 10.0 tf/cm. When a diameter of a pressure roll is 100 mm to 250 mm, for example, a line pressure load for roll bonding is preferably 1.5 tf/cm to 5.0 tf/cm, and more preferably 1.6 tf/cm to 4.0 tf/cm. When a roll diameter is increased or the stainless steel plate and the other metal plate are thick before bonding, however, it is occasionally necessary to increase a line pressure load to maintain a pressure that is necessary to achieve a given reduction ratio, and the line pressure load is not limited thereto.

At the time of bonding, temperature is not particularly limited. For example, bonding is carried out at room temperature to 150° C.

Bonding is preferably carried out in the non-oxidizing atmosphere, such as in an inert gas atmosphere (e.g., Ar), so as to prevent the bonding strength between the stainless steel plate and the other metal plate from lowering, which results from readsorption of oxygen to the surface of the stainless steel plate and that of the other metal plate.

The roll-bonded laminate obtained by bonding the stainless steel plate to the other metal plate in the manner described above is subjected to thermal treatment. Thus, adhesion between layers can be improved. Such thermal treatment can also serve as annealing of the aluminum alloy layer when the other metal plate is made of an aluminum alloy or the like.

In the case of batch thermal treatment, for example, thermal treatment temperature is 200° C. to 500° C., and preferably 200° C. to 400° C. In the case of continuous thermal treatment, for example, it is 300° C. to 890° C., and preferably 300° C. to 800° C. By performing the thermal treatment within such temperature range, the peel strength of the roll-bonded laminate is increased to 60 N/20 mm or higher, and molding workability is improved as a consequence. Such thermal treatment temperature is within a nonrecrystallized temperature range for stainless steel, and stainless steel is not substantially softened at such temperature. In the present embodiment, the reduction ratio of the stainless steel layer at the time of bonding and the thermal treatment temperature are adjusted within predetermined ranges. Thus, the peel strength of the roll-bonded laminate is improved to a significant extent. As a result, molding workability is improved. The term "thermal treatment temperature" refers to a temperature of the roll-bonded laminate to be subjected to thermal treatment.

Through the thermal treatment, at least metal elements contained in stainless steel (e.g., Fe, Cr, and Ni) are thermally diffused in the other non-stainless steel metal layer. Alternatively, metal elements contained in stainless steel and metal elements contained in the non-stainless steel metal layer may be thermally diffused alternately.

A duration of thermal treatment can be adequately determined in accordance with a thermal treatment method (batch or continuous thermal treatment), thermal treatment temperature, or a size of a roll-bonded laminate subjected to thermal treatment. In the case of batch thermal treatment, for example, temperature of the roll-bonded laminate is raised to a given level, and the roll-bonded laminate is then held at that temperature for 0.5 to 10 hours, and preferably for 2 to 8 hours. If an intermetallic compound is not generated, batch thermal treatment may be carried out for 10 hours or longer. In the case of continuous thermal treatment, temperature of the roll-bonded laminate is raised to a given level, and the roll-bonded laminate is then held at that temperature for 20 seconds to 5 minutes. The term "duration of thermal treatment" refers to a duration after the temperature of the roll-bonded laminate to be subjected to thermal treatment is raised to a given level, and such duration does not include a period during which temperature of the roll-bonded laminate is raised. A duration of thermal treatment may be approximately 1 to 2 hours when a material is as small as the A4 paper size in the case of batch thermal treatment. In the case of a large material, such as a long coil material with a width of 100 mm or larger and a length of 10 m or longer, batch thermal treatment needs to be carried out for approximately 2 to 8 hours.

III. Application of the Roll-Bonded Laminate

The roll-bonded laminate of the present embodiment can be used for various press-molded parts. When the roll-bonded laminate is thick, in particular, it has high strength and high molding workability. Thus, such roll-bonded laminate can be preferably used for an electronic device housing, and, in particular, a mobile electronic device (mobile terminal) housing. It is difficult to process an outer surface of a housing. When a housing comprising a metal layer of an aluminum alloy or pure aluminum as an inner surface and a stainless steel layer as an outer surface or a housing comprising a thin stainless steel layer is to be processed, in particular, the stainless steel layer becomes easy to break. With the use of the roll-bonded laminate according to the present embodiment, the stainless steel layer fits the shape of the other metal layer; that is, the laminate has satisfactory workability. Thus, the housing can be obtained without breaking the stainless steel layer. The resulting housing may be subjected to treatment aimed at discoloration prevention or decoration. It should be noted that applications of the roll-bonded laminate are not limited to the housing applications.

The electronic device housing preferably comprises the roll-bonded laminate according to the present invention on a back surface and/or a side surface.

Figure 5:
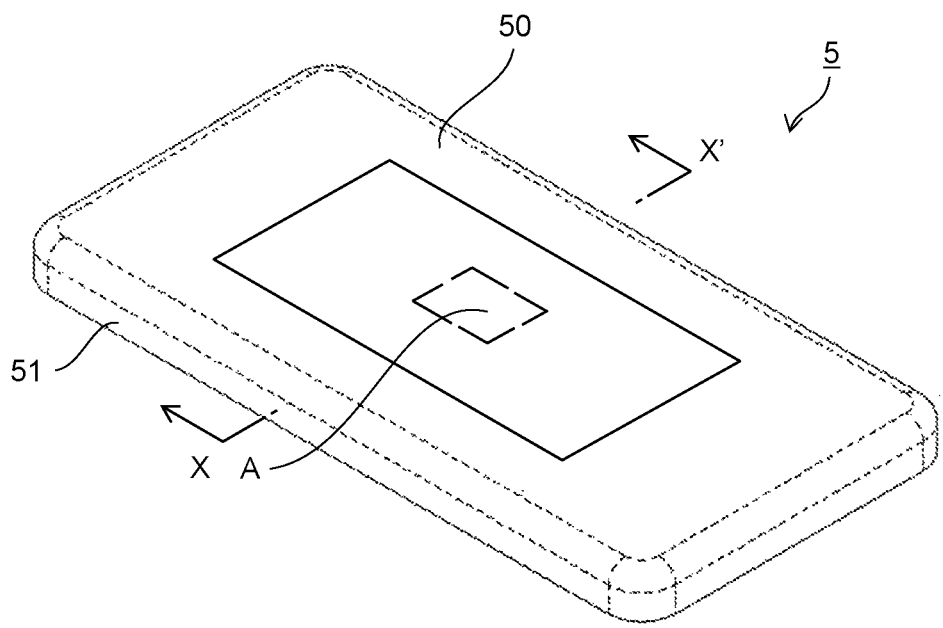
FIG. 5 is a perspective view showing the electronic device housing according to the first embodiment of the present invention.
Figure 6:
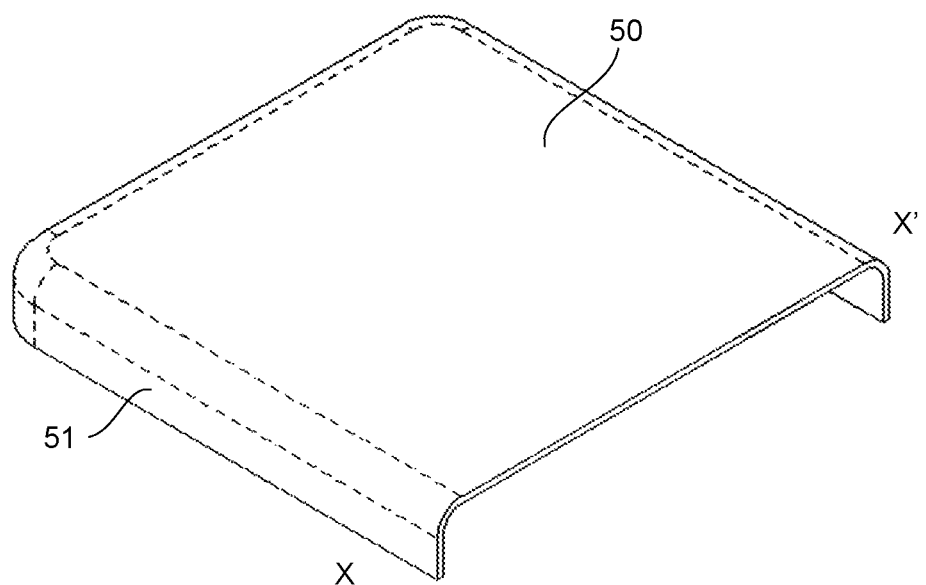
FIG. 6 is a perspective, cross-sectional view showing the electronic device housing according to the first embodiment of the present invention taken in the X-X' direction.

FIG. 5 and FIG. 6 show a first embodiment of the electronic device housing using the roll-bonded laminate of the present invention. FIG. 5 shows a perspective view of a first embodiment of the electronic device housing using the roll-bonded laminate of the present invention, and FIG. 6 shows a perspective, cross-sectional view of a first embodiment of the electronic device housing using the roll-bonded laminate of the present invention taken in the X-X' direction. An electronic device housing 5 is composed of a back surface 50 and a side surface 51, and the entire back surface 50 and side surface 51 or a part thereof can comprise the roll-bonded laminate of the present invention composed of a stainless steel layer and a non-stainless steel metal layer. The term "back surface" used herein refers to a surface opposite from the surface of the housing constituting an electronic device such as a smartphone (i.e., a mobile terminal) on which a display (not shown) is provided. The electronic device housing 5 may comprise a metal or plastic material provided on its inner surface separately from the roll-bonded laminate. When the electronic device housing 5 comprises the roll-bonded laminate on the back surface 50, it is sufficient if the entire back surface 50 or a part thereof (e.g., a plane region of 2 cm×2 cm or larger, such as a plane region of 25 mm×25 mm, shown as a plane region A in FIG. 5) has the properties of the roll-bonded laminate described above. While the electronic device housing 5 is constituted to comprise the roll-bonded laminate on its back surface 50, the structure of the housing is not limited thereto depending on the structure of the electronic device. The back surface 50 and the side surface 51 may be each composed of the roll-bonded laminate, or the side surface 51 may comprise the roll-bonded laminate.

Subsequently, a second embodiment of the electronic device housing using the roll-bonded laminate of the present invention is described. According to the present embodiment, an electronic device housing as a central frame is sandwiched by a display comprising a glass or resin and a back surface, an electronic device housing is composed of a side surface and an inner reinforcement frame connected to the side surface, and the inner reinforcement frame constitutes the back surface of the electronic device housing. The side surface and the inner reinforcement frame or a part thereof of the electronic device housing can comprise the roll-bonded laminate composed of a stainless steel layer and a non-stainless steel metal layer. The "inner reinforcement frame" is a support plate that is located inside an electronic device such as a smartphone and plays a role for improving rigidity of the entire electronic device and as a support comprising components such as a battery or a printed substrate mounted thereon. In general, the inner reinforcement frame comprises holes for connection or assembly. A hole can be made by press working or other means. According to the present embodiment, the side surface may or may not be integrated with the inner reinforcement frame. Also, the roll-bonded laminate may be selectively used for the side surface. It should be noted that the electronic device housing according to the present embodiment can be adequately modified in accordance with the structure of the electronic device as with the case of the electronic device housing 5 and that the structure of the electronic device housing is not limited to the structure described above.

EXAMPLES

Hereafter, the present invention is described in greater detail with reference to examples and reference examples, although the scope of the present invention is not limited to these examples.

Example 1

The roll-bonded laminate was produced via surface-activated bonding. SUS304 BA (thickness 0.05 mm) was used as a stainless steel plate, and A5052 aluminum alloy (thickness 0.8 mm) was used as an aluminum plate. SUS304 and A5052 were subjected to sputter etching. SUS304 was subjected to sputter etching at 0.3 Pa and a plasma output of 700 W for 12 minutes, and A5052 was subjected to sputter etching at 0.3 Pa and a plasma output of 700 W for 12 minutes. After the sputter-etching treatment, SUS304 was roll-bonded to A5052 with a roll diameter of 100 mm to 250 mm at room temperature, a line pressure load of 0.5 tf/cm to 5.0 tf/cm, and a reduction ratio of the stainless steel layer of 0% to 5%. Thus, the roll-bonded laminate of SUS304 and A5052 was obtained. This roll-bonded laminate was subjected to batch thermal treatment at 300° C. for 1 hour.

Examples 2 to 6 and Comparative Examples 1 to 3

The roll-bonded laminates of Examples 2 to 6 and Comparative Examples 1 to 3 were produced in the same manner as in Example 1, except that steel type, conditions, and thickness of the original stainless steel plate and/or aluminum type and thickness of the original aluminum plate were changed and the pressure at the time of bonding was changed to a given level.

In Example 2, SUS316L 1/2H (thickness 0.05 mm) was used as a stainless steel plate, and A5052 aluminum alloy (thickness 0.8 mm) was used as an aluminum plate.

In Example 3, SUS304 1/2H (thickness 0.1 mm) was used as a stainless steel plate, and A5052 aluminum alloy (thickness 0.8 mm) was used as an aluminum plate.

In Example 4, SUS304 1/2H (thickness 0.1 mm) was used as a stainless steel plate, and A5052 aluminum alloy (thickness 0.8 mm) was used as an aluminum plate.

In Example 5, SUS304 1/2H (thickness 0.1 mm) was used as a stainless steel plate, and A1050 aluminum (thickness 0.8 mm) was used as an aluminum plate.

In Example 6, SUS304 1/2H (thickness 0.2 mm) was used as a stainless steel plate, and A5052 aluminum alloy (thickness 0.8 mm) was used as an aluminum plate.

In Comparative Example 1, SUS304 3/4H (thickness 0.1 mm) was used as a stainless steel plate, and A5052 aluminum alloy (thickness 0.8 mm) was used as an aluminum plate.

In Comparative Example 2, SUS304 3/4H (thickness 0.2 mm) was used as a stainless steel plate, and A1050 aluminum (thickness 0.8 mm) was used as an aluminum plate.

In Comparative Example 3, SUS304 3/4H (thickness 0.3 mm) was used as a stainless steel plate, and A1050 aluminum (thickness 0.8 mm) was used as an aluminum plate.

Example 8

SUS304 BA (thickness 0.25 mm) was used as a stainless steel plate, and A5052 aluminum alloy (thickness 0.8 mm) was used as an aluminum plate. SUS304 and A5052 were subjected to sputter etching. SUS304 was subjected to sputter etching at 0.1 Pa, a plasma output of 4800 W, and a line velocity of 4 m/min. A5052 was subjected to sputter etching at 0.1 Pa, a plasma output of 6400 W, and a line velocity of 4 m/min. After the sputter-etching treatment, SUS304 was roll-bonded to A5052 at room temperature and a line pressure load of 3.0 tf/cm to 6.0 tf/cm. Thus, the roll-bonded laminate of SUS304 and A5052 was obtained. This roll-bonded laminate was subjected to batch thermal treatment at 300° C. for 8 hours.

Examples 9 to 12

The roll-bonded laminates of Examples 9 to 12 were produced in the same manner as in Example 8, except that steel type, conditions, and thickness of the original stainless steel plate and/or aluminum type and thickness of the original aluminum plate were changed and the pressure at the time of bonding was changed to a given level.

In Example 9, SUS304 1/2H (thickness 0.25 mm) was used as a stainless steel plate, and A5052 aluminum alloy (thickness 0.8 mm) was used as an aluminum plate.

In Example 10, SUS316L BA (thickness 0.2 mm) was used as a stainless steel plate, and A5052 aluminum alloy (thickness 0.8 mm) was used as an aluminum plate.

In Example 11, SUS304 BA (thickness 0.25 mm) was used as a stainless steel plate, and A1050 aluminum (thickness 0.8 mm) was used as an aluminum plate.

In Example 12, SUS316L BA (thickness 0.25 mm) was used as a stainless steel plate, and A1050 aluminum (thickness 0.8 mm) was used as an aluminum plate.

Example 7 and Comparative Examples 4 to 6

Roll-bonded laminates (thickness: 0.403 to 1.025 mm) each composed of a stainless steel plate and an aluminum alloy plate were prepared via cold roll bonding. The surface of the stainless steel plate and the surface of the aluminum alloy plate to be bonded to each other were subjected to brush polishing or other processing, the plates were superposed on top of each other and bonded to each other via cold rolling, and the resultant was further subjected to thermal treatment. Thus, roll-bonded laminates were prepared.

Figure 2:
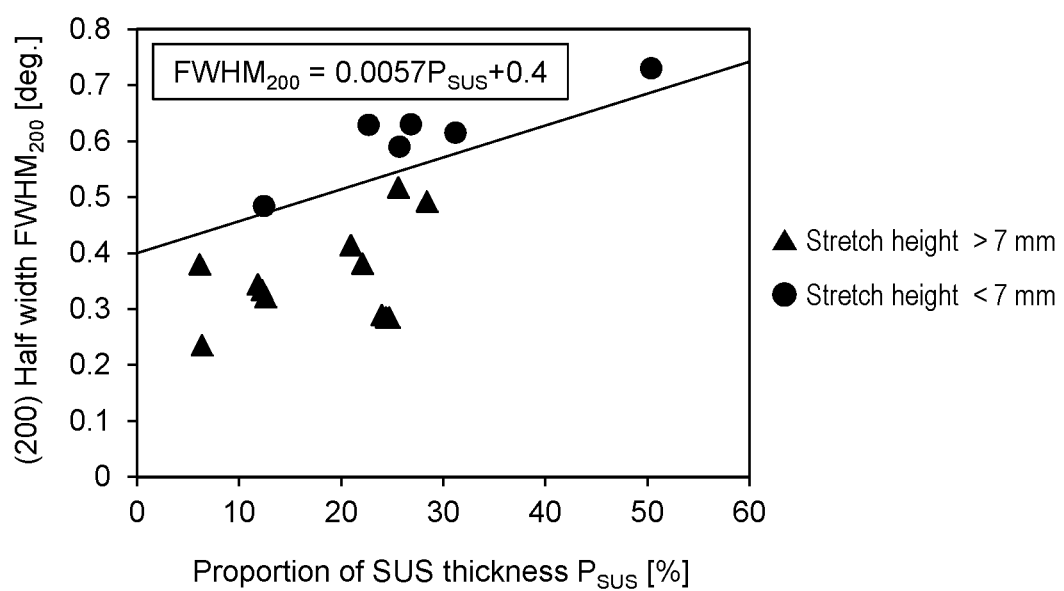
FIG. 2 shows a chart demonstrating a correlation between a proportion $P_{SUS}$ of thickness of the stainless steel layer and a half width $FWHM_{200}$ of a peak exhibiting a plane orientation (200).
Figure 3:
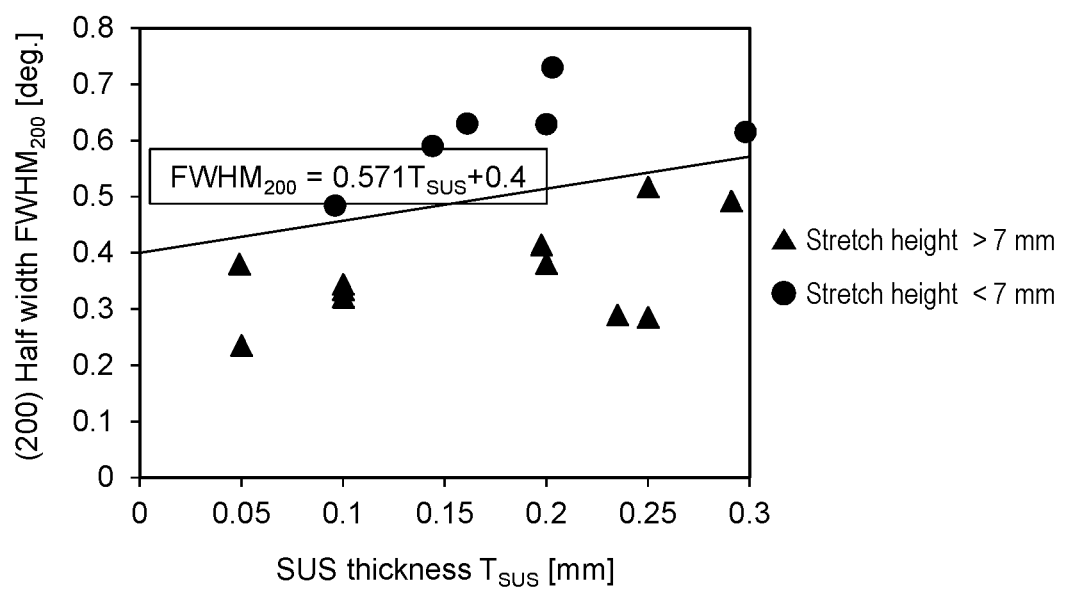
FIG. 3 shows a chart demonstrating a correlation between thickness $T_{SUS}$ of the stainless steel layer and a half width $FWHM_{200}$ of a peak exhibiting a plane orientation (200).
Figure 4:
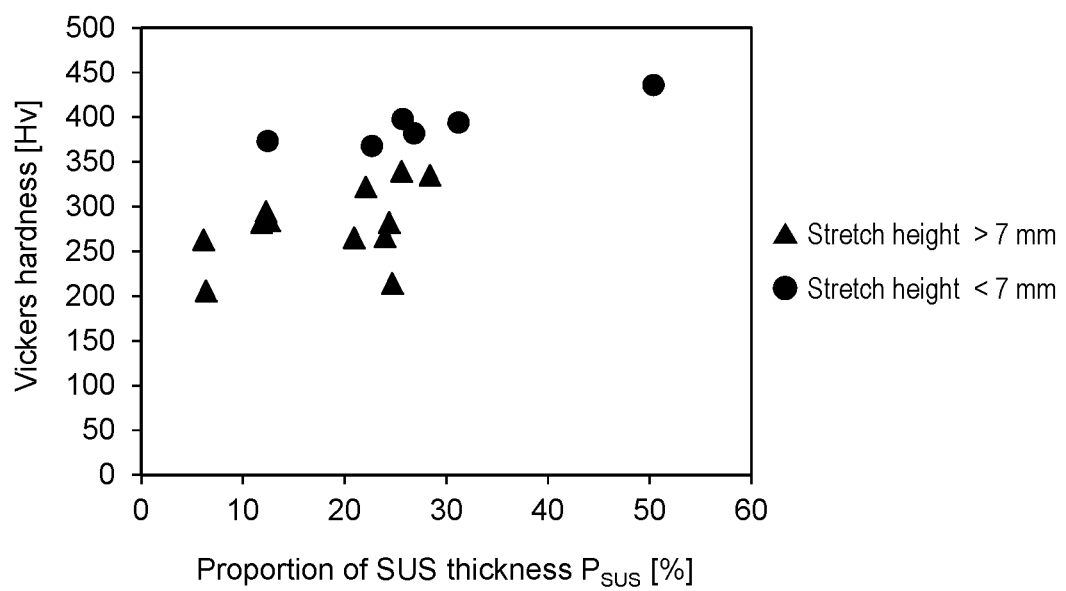
FIG. 4 shows a chart demonstrating a correlation between a proportion $P_{SUS}$ of thickness $T_{SUS}$ of the stainless steel layer and surface hardness of the stainless steel layer.

Table 1 summarizes a type and thickness of each layer of the roll-bonded laminate and the thickness proportion $P_{SUS}$ of the stainless steel layer. With the use of the X-ray diffraction analyzer (Smartlab, manufactured by Rigaku Corporation), the stainless steel layer was subjected to X-ray diffraction analysis, and the half width $FWHM_{200}$ of the peak exhibiting the crystal plane orientation (200) appearing in the range of $2\theta=48°$ to $52°$ was measured. Table 1 shows the measurement results. The stretch height of the roll-bonded laminate was measured by the Erichsen test. Measurement was carried out with the use of a mechanical Erichsen tester ESM-1 (cap: 2 mm, manufactured by Tokyo Koki Testing Machine Co., Ltd.) in accordance with JIS Z 2247 (Method of Erichsen test). Also, surface hardness (Hv) of the stainless steel layer was measured with the use of the Micro vickers hardness tester (load: 200 gf) in accordance with JIS Z 2244 (Vickers hardness test—Test method). Table 1 shows the measurements results concerning stretch height and Vickers hardness. FIG. 2 shows the correlation between the proportion $P_{SUS}$ of thickness of the stainless steel layer and the half width $FWHM_{200}$ of the peak exhibiting the plane orientation (200) of the roll-bonded laminates of Examples 1 to 12 and Comparative Examples 1 to 6. FIG. 3 shows the correlation between thickness $T_{SUS}$ of the stainless steel layer and the half width $FWHM_{200}$. FIG. 4 shows the correlation between the proportion $P_{SUS}$ of thickness of the stainless steel layer and surface hardness (Hv) of the stainless steel layer. At the time of half width measurement, the sample was polished. While a method of polishing is not particularly limited, surface processing is preferably carried out via buffing or electropolishing. An attention should be paid in the case of a method of polishing resulting in significant grinding since such polishing may affect $FWHM_{200}$.

TABLE 1

| | | SUS | | Al or Al alloy | | | | | | | | |
|---|---|---|---|---|---|---|---|---|---|---|---|---|
| | | Thickness $T_{SUS}$ (mm) (Measured after cladding) | SUS type | Thickness (mm) (Measured after cladding) | Al type | Total thickness T (mm) | Half width at peak (200) ($FWHM_{200}$) (°) | SUS hardness (Hv) | SUS thickness proportion ($P_{SUS}$) (%) | $0.0057P_{SUS} + 0.4$ | $0.571T_{SUS} + 0.4$ | Stretch height (mm) |
| Examples | 1 | 0.050 | 304 | 0.736 | A5052 | 0.786 | 0.235 | 205.8 | 6.36 | 0.436 | 0.429 | 8.20 |
| | 2 | 0.049 | 316L | 0.750 | A5052 | 0.799 | 0.380 | 262.8 | 6.13 | 0.435 | 0.428 | 7.15 |
| | 3 | 0.100 | 304 | 0.745 | A5052 | 0.845 | 0.344 | 282.2 | 11.83 | 0.467 | 0.457 | 8.49 |
| | 4 | 0.100 | 304 | 0.694 | A5052 | 0.794 | 0.321 | 284.4 | 12.59 | 0.472 | 0.457 | 8.26 |
| | 5 | 0.100 | 304 | 0.716 | A1050 | 0.816 | 0.334 | 294.4 | 12.25 | 0.470 | 0.457 | 8.32 |
| | 6 | 0.200 | 304 | 0.706 | A5052 | 0.906 | 0.381 | 322.0 | 22.08 | 0.526 | 0.514 | 8.05 |
| | 7 | 0.291 | 304 | 0.734 | A5052 | 1.025 | 0.492 | 335.0 | 28.39 | 0.562 | 0.566 | 9.32 |
| | 8 | 0.235 | 304 | 0.745 | A5052 | 0.980 | 0.289 | 266.3 | 23.98 | 0.537 | 0.534 | 8.70 |
| | 9 | 0.250 | 304 | 0.727 | A5052 | 0.977 | 0.517 | 339.4 | 25.59 | 0.546 | 0.543 | 7.60 |

TABLE 1-continued

|  |  | SUS | | Al or Al alloy | | | | | | | | |
|---|---|---|---|---|---|---|---|---|---|---|---|---|
|  |  | Thickness $T_{SUS}$ (mm) (Measured after cladding) | SUS type | Thickness (mm) (Measured after cladding) | Al type | Total thickness T (mm) | Half width at peak (200) ($FWHM_{200}$) (°) | SUS hardness (Hv) | SUS thickness proportion ($P_{SUS}$) (%) | $0.0057P_{SUS} + 0.4$ | $0.571T_{SUS} + 0.4$ | Stretch height (mm) |
|  | 10 | 0.198 | 316L | 0.746 | A5052 | 0.944 | 0.414 | 265.2 | 20.94 | 0.519 | 0.513 | 8.39 |
|  | 11 | 0.250 | 304 | 0.762 | A1050 | 1.012 | 0.285 | 214.2 | 24.69 | 0.541 | 0.543 | 10.45 |
|  | 12 | 0.250 | 316L | 0.775 | A1050 | 1.025 | 0.285 | 282.1 | 24.38 | 0.539 | 0.543 | 9.31 |
| Comparative Examples | 1 | 0.096 | 304 | 0.676 | A5052 | 0.772 | 0.484 | 373.4 | 12.44 | 0.471 | 0.455 | 6.41 |
|  | 2 | 0.200 | 304 | 0.682 | A1050 | 0.882 | 0.629 | 367.8 | 22.68 | 0.529 | 0.514 | 6.80 |
|  | 3 | 0.298 | 304 | 0.657 | A1050 | 0.955 | 0.615 | 394.0 | 31.20 | 0.578 | 0.570 | 6.79 |
|  | 4 | 0.161 | 304 | 0.439 | A5052 | 0.600 | 0.630 | 382.0 | 26.83 | 0.553 | 0.492 | 6.30 |
|  | 5 | 0.144 | 304 | 0.416 | A5052 | 0.560 | 0.590 | 398.0 | 25.71 | 0.547 | 0.482 | 5.70 |
|  | 6 | 0.203 | 304 | 0.200 | A5052 | 0.403 | 0.730 | 436.0 | 50.37 | 0.687 | 0.516 | 5.60 |

As shown in Table 1 and FIG. 2, the roll-bonded laminates prepared in the examples satisfying the correlation represented by the formula: $FWHM_{200} \leq 0.0057P_{SUS} + 0.4$ were found to exhibit the stretch height exceeding 7 mm determined by the Erichsen test; that is, such roll-bonded laminates were excellent in molding workability. In contrast, the roll-bonded laminates of Comparative Examples 1 to 6 that did not satisfy the correlation above were found to exhibit the stretch height of lower than 7 mm; that is, such roll-bonded laminates were found insufficient for housing applications. As shown in Table 1 and FIG. 3, in addition, molding workability was found to improve when the correlation represented by the following formula was satisfied.

$$FWHM_{200} \leq 0.571T_{SUS} + 0.4$$

Subsequently, the roll-bonded laminates of Reference Examples 1 to 10 were produced and evaluated in terms of the properties described below.

Reference Example 1

SUS304 (thickness 0.2 mm) was used as a stainless steel plate, and A5052 aluminum alloy (thickness 0.8 mm) was used as an aluminum plate. SUS304 and A5052 were subjected to sputter etching. SUS304 was subjected to sputter etching at 0.1 Pa and a plasma output of 700 W for 13 minutes, and A5052 was subjected to sputter etching at 0.1 Pa and a plasma output of 700 W for 13 minutes. After the sputter-etching treatment, SUS304 was roll-bonded to A5052 with a roll diameter of 130 to 180 mm at room temperature and a line pressure load of 1.9 tf/cm to 4.0 tf/cm. Thus, the roll-bonded laminate of SUS304 and A5052 was obtained. This roll-bonded laminate was subjected to batch annealing at 300° C. for 2 hours. Concerning the roll-bonded laminate subjected to annealing, the reduction ratio of the stainless steel layer, that of the aluminum alloy layer, and that of the entire roll-bonded laminate were determined based on the thickness of the original plates before bonding and the thickness of the final form of the roll-bonded laminate.

Reference Examples 2 to 4, 6, and 7

The roll-bonded laminates of Reference Examples 2 to 4, 6, and 7 were obtained in the same manner as in Reference Example 1, except that thickness of the original aluminum plate, the reduction ratio depending on the pressure at the time of bonding, and/or the annealing temperature were changed to given levels. In Reference Example 2, the roll-bonded laminate produced in Example 6 was cut and subjected to evaluation. While slight difference was observed in thickness of the roll-bonded laminate between Example 6 and Reference Example 2, thickness of the roll-bonded laminate of Example 6 was substantially the same as that of Reference Example 2.

Reference Example 5

The roll-bonded laminate produced in Example 9 was cut and subjected to evaluation. While slight difference was observed in thickness of the roll-bonded laminate between Example 9 and Reference Example 5, thickness of the roll-bonded laminate of Example 9 was substantially the same as that of Reference Example 5.

Concerning the roll-bonded laminates of Reference Examples 1 to 7, the 180° peel strength of the roll-bonded laminates after bonding and before annealing and that of the final form of the roll-bonded laminates after annealing were measured. Concerning the roll-bonded laminates of Reference Examples 1 to 7, in addition, tensile strength and elongation were measured, and bending workability and drawing workability were evaluated. Measurement of 180° peel strength, tensile strength, and elongation and evaluation of bending workability and drawing workability were carried out in the manner described below.

180° Peel Strength

A test piece with a width of 20 mm was prepared from the roll-bonded laminate, the stainless steel layer was partly peeled from the aluminum layer, the aluminum layer side was fixed, the stainless steel layer was pulled toward the direction opposite by 180° from the aluminum layer side at a tension rate of 50 mm/min, and a force required to peel the stainless steel layer from the aluminum layer (unit: N/20 mm) was measured using a universal testing machine, TENSILON RTC-1350A (manufactured by Orientec Corporation).

Tensile Strength

Tensile strength was measured with the use of a universal testing machine, TENSILON RTC-1350A (manufactured by Orientec Corporation), and Special Test Piece No. 6 specified by JIS Z 2201 in accordance with JIS Z 2241 (Metallic materials—Method of tensile testing).

Elongation

With the use of the test piece for the tensile test, elongation was measured in accordance with the method of measurement of elongation at break specified by JIS Z 2241.

Bending Workability

A test piece was bent by a V-block method (a bending angle of 60°; processed with a pressing tool with R of 0.5, a load of 1 kN; test material width of 10 mm; JIS Z 2248).

Drawing Workability

With the use of the mechanical Erichsen testing machine (a universal sheet metal testing machine; model: 145-60; Erichsen), cylindrical drawing was performed and evaluated.

Drawing conditions were as follows.

Blank diameter (φ): 49 mm (drawing ratio: 1.63) or 55 mm (drawing ratio: 1.83)
Punch size (φ):30 mm
Punch shoulder (R): 3.0
Die shoulder (R): 3.0
Wrinkle suppression pressure: 3 N
Lubricant oil: Press oil (No. 640, Nihon Kohsakuyu Co., Ltd.)
Mold temperature: room temperature (25° C.)
Mold velocity: 50 mm/sec Drawing workability was evaluated according to a 5-point scale shown in Table 2 below. A higher numerical value indicates higher drawing workability. With a blank diameter of 55 mm (drawing ratio of 1.83), drawing work is more difficult compared with the case with a blank diameter of 49 mm (drawing ratio of 1.63).

TABLE 2

| φ | Drawing ratio | 1 | 2 | 3 | 4 | 5 |
|---|---|---|---|---|---|---|
| 49 | 1.63 | Poor | Good | Good | Good | Excellent |
| 55 | 1.83 | Poor | Fair | Average | Good | Excellent |

Poor: Undrawable;
Fair: Drawable with cracks;
Average: Drawable with some wrinkles;
Good: Drawable;
Excellent: Drawable with good appearance Table 3 shows constitutions, production conditions, and the results of evaluation of the roll-bonded laminates of Reference Examples 1 to 7.

Table 3 demonstrates that, compared with the roll-bonded laminate of Reference Example 6 in which the reduction ratio of the aluminum alloy layer is lower than 5%, the roll-bonded laminates of Reference Examples 1 and 2 prepared by increasing the pressure at the time of bonding to increase the reduction ratio of the aluminum alloy layer have the equivalent peal strength after bonding and before annealing, but the peel strength thereof was significantly increased after annealing. That is, drawing workability was improved. According to Reference Examples 2, 3, and 7, there may be an adequate annealing temperature range in which the peel strength of the roll-bonded laminate after annealing is increased. In the case of batch annealing, an adequate temperature range may be from 200° C. to 370° C. When an aluminum plate is thin, the peel strength of the roll-bonded laminate can be increased. In such a case, in particular, a range of improvement in the peel strength before annealing to after annealing was significant (Reference Example 4).

The results demonstrated above were compared with the results attained in Reference Examples 8 to 10 in which pure aluminum was used. As a result, it was found that the peel strength was less likely to be improved in the case of an aluminum alloy plate, compared with the case of a pure aluminum plate. This is deduced to occur for the following reasons. That is, an aluminum alloy is harder than pure aluminum, it is less likely to be deformed, the peel strength thereof is less likely to be increased at the time of bonding, an intermetallic compound is likely to be generated on the bonding interface upon annealing, and the peel strength is deteriorated as a consequence.

Reference Example 8

SUS304 (thickness 0.2 mm) was used as a stainless steel plate, and A1050 pure aluminum (thickness 0.85 mm) was used as an aluminum plate. SUS304 and A1050 were subjected to sputter etching. SUS304 was subjected to sputter etching at 0.1 Pa and a plasma output of 700 W for 13 minutes. A1050 was subjected to sputter etching at 0.1 Pa and a plasma output of 700 W for 13 minutes. After the sputter-etching treatment, SUS304 was roll-bonded to A1050 with a roll diameter of 130 mm to 180 mm at room temperature and a line pressure load of 1.9 tf/cm to 4.0 tf/cm. Thus, the roll-bonded laminate of SUS304 and A1050 was obtained. This roll-bonded laminate was subjected to batch annealing at 300° C. for 2 hours.

Reference Examples 9 and 10

The roll-bonded laminates of Reference Examples 9 and 10 were produced in the same manner as in Reference Example 8, except that the reduction ratio depending on the pressure at the time of bonding and/or the annealing temperature were changed to given levels.

The roll-bonded laminates of Reference Examples 8 to 10 were evaluated in the same manner as described above. Table 4 shows constitutions, production conditions, and the results of evaluation of the roll-bonded laminates of Reference Examples 8 to 10.

TABLE 3

| | Original plate thickness (mm) | | Total thickness | Reduction ratio (%) | | | Peel strength after bonding (N/20 mm) | Annealing temperature (° C.) | Peel strength after annealing (N/20 mm) | Bending workability | Drawing workability | Elongation (%) | Tensile strength (N) |
|---|---|---|---|---|---|---|---|---|---|---|---|---|---|
| | SUS | Al | | SUS | Al | Entire laminate | | | | | | | |
| Ref. Ex. 1 | 0.2 | 0.8 | 1 | 2.5 | 6.38 | 5.60 | 10 or lower | 300 | 74.5 | Good | 3 | 55 | 4560 |
| Ref. Ex. 2 | 0.2 | 0.8 | 1 | 7 | 9.38 | 8.90 | 10 or lower | 300 | 88 | Good | 4 | 60 | 4561 |
| Ref. Ex. 3 | 0.2 | 0.8 | 1 | 7 | 9.38 | 8.90 | 10 or lower | 350 | 136 | Good | 5 | 51.5 | 4570 |
| Ref. Ex. 4 | 0.2 | 0.4 | 0.6 | 4 | 6.75 | 5.83 | 10 or lower | 300 | 162 | Good | 5 | 49 | 3520 |
| Ref. Ex. 5 | 0.25 | 0.8 | 1.05 | 4 | 8.75 | 7.61 | 10 or lower | 300 | 120 | Good | 5 | 45 | — |
| Ref. Ex. 6 | 0.2 | 0.8 | 1 | 1.5 | 4.88 | 4.20 | 10 or lower | 300 | 34 | Good | 1 | 54 | 4744 |
| Ref. Ex. 7 | 0.2 | 0.8 | 1 | 7 | 9.38 | 8.90 | 10 or lower | 400 | 4 | Poor | — | 61.5 | 4559 |

TABLE 4

| | Original plate thickness (mm) | | | Reduction ratio (%) | | | Peel strength after bonding (N/20 mm) | Annealing temperature (° C.) | Peel strength after annealing (N/20 mm) | Bending workability | Elongation (%) | Tensile strength (N) |
|---|---|---|---|---|---|---|---|---|---|---|---|---|
| | SUS | Al | Total thickness | SUS | Al | Entire plate | | | | | | |
| Ref. Ex. 8 | 0.2 | 0.85 | 1.05 | 5 | 13.88 | 12.19 | 15-25 | 300 | 285 | Good | 65 | 3388 |
| Ref. Ex. 9 | 0.2 | 0.85 | 1.05 | 5 | 13.88 | 12.19 | 15-25 | 400 | 395 | Good | 64 | 3286 |
| Ref. Ex. 10 | 0.2 | 0.85 | 1.05 | 1.5 | 9.41 | 7.90 | 15-25 | 300 | 128 | Good | 61 | 3542 |

Table 4 demonstrates that a range of improvement in the peel strength before annealing to after annealing can also be enlarged when an aluminum plate is made of pure aluminum. As with the case of an aluminum alloy plate, specifically, the reduction ratio may be increased at the time of bonding, so that the peel strength can be increased to a significant extent after annealing while the peel strength is equivalent after bonding.

DESCRIPTION OF REFERENCE SIGNS

1: Roll-bonded laminate
10: Stainless steel layer
20: Non-stainless steel metal layer
5: Electronic device housing
50: Back surface
51: Side surface
A: Plane region All publications, patents, and patent applications cited herein are incorporated herein by reference in their entirety.

The invention claimed is:

1. A roll-bonded bi-layer laminate comprising a stainless steel layer and a metal layer of aluminum or an aluminum alloy, wherein:

the roll-bonded bi-layer laminate has a thickness T of 0.786 mm to 3 mm, a stretch height determined by the Erichsen test is 7.0 mm or more, and a correlation between a proportion $P_{SUS}$ of thickness $T_{SUS}$ of the stainless steel layer relative to the thickness T and a half width $FWHM_{200}$ of a peak exhibiting a crystal plane orientation (200) obtained by analyzing the stainless steel layer side via X-ray diffraction analysis satisfy the correlation: $FWHM_{200} \leq 0.0057 P_{SUS} + 0.4$, wherein the proportion $P_{SUS}$ of thickness $T_{SUS}$ of the stainless steel layer relative to the thickness T is 5% to 28.39%, wherein the stainless steel layer has a surface hardness (Hv) of 294.4 or less, and wherein the roll-bonded bi-layer laminate has an elongation of 35% or higher.

2. The roll-bonded bi-layer laminate according to claim 1, which is used for an electronic device housing.

3. An electronic device housing comprising the roll-bonded bi-layer laminate according to claim 1.

* * * * *